No. 637,883. Patented Nov. 28, 1899.
J. W. MILLER.
DRAFT EQUALIZER.
(Application filed Oct. 18, 1899.)
(No Model.)
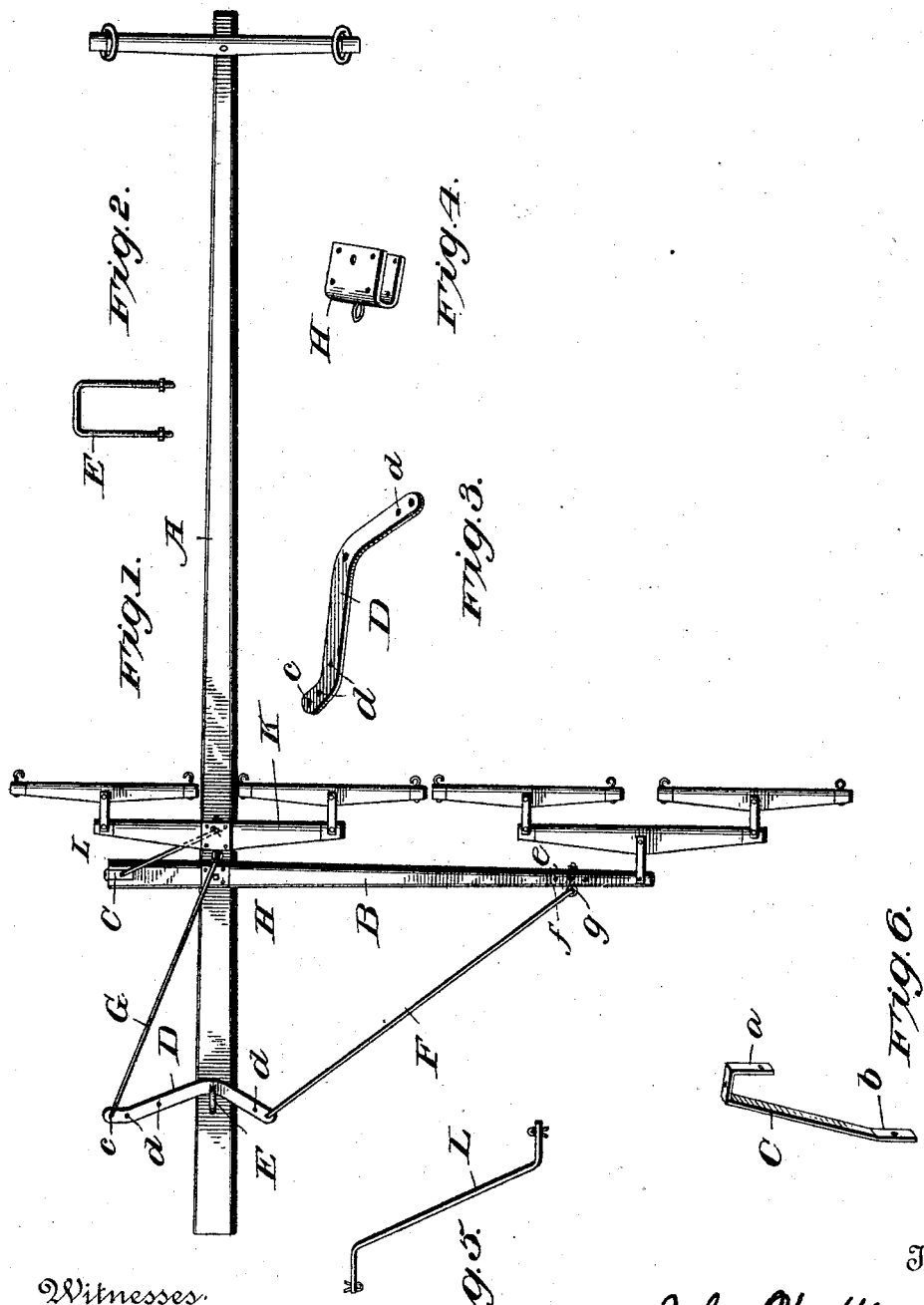
Witnesses
L. C. Hills
J. P. Richards
Inventor
John W. Miller
By M. A. Redmond
Attorney

UNITED STATES PATENT OFFICE.

JOHN W. MILLER, OF BISMARCK, ILLINOIS.

DRAFT-EQUALIZER.

SPECIFICATION forming part of Letters Patent No. 637,883, dated November 28, 1899.

Application filed October 18, 1899. Serial No. 733,962. (No model.)

*To all whom it may concern:*

Be it known that I, JOHN W. MILLER, a citizen of the United States, residing at Bismarck, in the county of Vermilion and State of Illinois, have invented certain new and useful Improvements in Draft-Equalizers; and I do declare the following to be a full, clear, and exact description of the invention, such as will enable others skilled in the art to which it appertains to make and use the same.

This invention relates to draft-equalizers where three or more animals are attached to a vehicle, and particularly for binders and other agricultural machines in the use of which there is a tendency to side draft; and it has for its object to provide a simple, durable, and inexpensive device adapted for the attachment and equalization of the draft of either three or four horses; and it consists of the parts and combinations of parts hereinafter described and claimed.

In the accompanying drawings, forming a part of this specification, Figure 1 is a plan view of my improved draft-equalizer in position on a pole or tongue; Fig. 2, a detail view of a U bolt or clip; Fig. 3, a perspective detail view of the sway-bar; Fig. 4, a perspective detail view of the clevis; Fig. 5, a perspective detail view of a link, and Fig. 6 a perspective detail view of a brace-iron.

Similar letters refer to similar parts throughout all the views.

Referring to the drawings, A represents a pole or tongue, which may be of the usual or any desired type, and B a lever pivotally secured to said pole or tongue, so as to provide for the projection of about three-fourths of the length of said lever from the off side of the pole or tongue and of the other fourth from the opposite or near side of the same. The lever B is further secured to the pole and the sagging of the long arm thereof prevented by a brace-iron C, which is bent at one end, as at *a*, so as to overlap and embrace the end of the short arm of lever B, and at its other end said brace-iron is bent, as at *b*, for attachment to the bolt or pin by which the lever B is pivoted to the pole or tongue. This construction and arrangement of the brace-iron C, besides being economical, affords greater strength and is better adapted to prevent sagging of either end of the lever, and the brace itself is not liable to bend and thus let down the lever.

D represents an equalizer or sway-bar, which is bent or curved somewhat sharply to a bow shape and having one end, as at *c*, extended and slightly curved backward, said sway-bar being pivotally connected by means of the U bolt or clip E to the pole or tongue in the rear of and at a suitable distance from the lever B. The short arm of the sway-bar or equalizer D is connected by a rod F to the long arm of the lever B, and the long arm of said sway-bar is connected by a rod G to an eyebolt secured in a clevis H, which is firmly secured to the center of a doubletree K, to the ends of which singletrees are suitably attached. The sway-bar or equalizer D is formed with perforations *d* in each arm, whereby the attachment of rods F G thereto may be adjusted nearer to or farther from the pivotal point of the sway-bar in order to increase or decrease the leverage of the connected parts. Also the long arm of the lever B is formed with vertical perforations *e* and transverse perforations *f*, the former being for the attachment of the singletree when it is desired to convert the device into a three-horse evener and the latter for an eyebolt *g*, to which the rod F is connected, whereby the point of connection of said rod to the lever B may be varied in order to increase or decrease the leverage of said lever B.

A link L, having its ends bent nearly at right angles and in opposite directions, as clearly shown in Fig. 5, connects the short arm of the lever B to the center of the doubletree K. This is accomplished by inserting one end of the link in a perforation formed through the brace-iron C and the end of the lever B from above and inserting the other end through a perforation in the clevis H and the doubletree K at its center from below and securing it in place by keys. From the above description it will be understood that the horses of the near team are alined perfectly at each side of the pole and that the near and off team are in a line and neither in advance of the other owing to the doubletrees being in line. Also by adjusting the eyebolt *g* to or from the pivoted point of the lever B the off team can be made to pull more or less, as desired, to equalize the strength of the teams. It will be noticed that the near-team doubletree is in perfect line with the doubletree for the off team, so that equal strain is placed on each team while at work, and that owing to the length of the link L and the arrangement of doubletree K in advance of lever B the teams can move ahead or fall back a greater distance without much variation of the doubletree from the center of the tongue, thereby enabling the near team to retain its proper position relative to the tongue.

In converting my device into a three-horse evener it is only necessary to turn the sway-bar D so that its long end will project from the off side of the pole and remove the off-team doubletree and connect a singletree to the lever B through one of the perforations e, thus bringing the three horses closely together in position to best exert their strength. Also owing to the bow shape of the sway-bar D either team may pull ahead or fall back without causing any difference whatever in the strain upon them, and such advance or dropping back of the team causes but slight variation of the doubletree K from the center of the pole.

Having thus described my invention, what I claim as new, and desire to secure by Letters Patent, is—

1. In a draft-equalizer, the combination, with a tongue or pole, of a lever pivoted to the pole near one end, a brace-iron secured to the short arm of said lever and to the pivot pin or bolt thereof, a bow-shaped sway-bar pivoted to the pole in rear of said lever, a rod connecting one end of said sway-bar to the long end of said lever, a doubletree arranged in front of said lever, a link connecting the short arm of said lever to the center of said doubletree, and a rod connecting one end of the sway-bar and said doubletree.

2. In a draft-equalizer, the combination, with a tongue or pole, of a lever pivoted to the pole or tongue near one of its ends and having a series of vertical and transverse perforations formed in its long arm, a brace having one end bent over the short arm of said lever and its other end secured by the pivot pin or bolt of the lever, a bow-shaped sway-bar pivoted to the pole or tongue in rear of the lever, a doubletree arranged in front of the lever, a link connecting the doubletree and the short end of the lever, a rod connecting the doubletree and one end of the sway-bar, and a rod connecting the other end of the sway-bar and the long arm of the lever.

In testimony whereof I affix my signature in presence of two witnesses.

JNO. W. MILLER.

Witnesses:
   D. L. OGDON,
   E. D. BROUN.